United States Patent [19]

Fleming et al.

[11] Patent Number: 4,496,105
[45] Date of Patent: Jan. 29, 1985

[54] FORAGE HARVESTER DRIVE AND ELECTRIC CONTROL THEREFOR

[75] Inventors: Philip F. Fleming; Virgil B. Martin, both of West Bend; Roger L. Villers, Waubeka; Jaime J. Shutes, West Bend, all of Wis.

[73] Assignee: Gehl Company, West Bend, Wis.

[21] Appl. No.: 441,946

[22] Filed: Nov. 15, 1982

[51] Int. Cl.³ .............................................. B02C 25/00
[52] U.S. Cl. ...................................... 241/32; 241/35; 241/60; 241/101.7
[58] Field of Search ...................... 241/60, 55, 56, 32, 241/34, 35, 101.7

[56] References Cited

U.S. PATENT DOCUMENTS 3,999,674 12/1976 Meitl .................................. 241/35 X
4,049,207 9/1977 Storm et al. ...................... 241/101.7
4,387,857 6/1983 Young et al. ................. 241/101.7 X

FOREIGN PATENT DOCUMENTS

771624 10/1980 U.S.S.R. ................................ 241/35

*Primary Examiner*—Mark Rosenbaum
*Attorney, Agent, or Firm*—James E. Nilles

[57] ABSTRACT

A forage harvester adapted to be drawn by and powered from a tractor includes a feed roll mechanism for receiving and feeding crop material to a cutterhead mechanism which then supplies cut-up crop material to a blower for transfer to a forage wagon. A main drive shaft on the harvester is driven by the tractor PTO and drives the cutterhead mechanism and the blower. A drive mechanism supplies motive power from the main drive shaft to drive the feed roll mechanism and any harvester attachments in forward or reverse and includes a single normally disengaged electrically engageable electric clutch and a solenoid-operated forward-/reverse transmission normally spring-biased in forward and shiftable into reverse when its solenoid is energized. Torque sensor devices are provided to mechanically disconnect the feed roll mechanism and any harvester attachment from being driven by the transmission when an overload occurs. An electrical control system for operating the electric clutch and the solenoid for the transmission includes manually operable selector switches located on the tractor to provide OFF-MANUAL-AUTOMATIC modes for clutch operation and to provide FORWARD/REVERSE modes for transmission operation when in the AUTOMATIC mode. The electric control system further includes overload responsive switches on the harvester (responsive to operation of the torque sensor devices for the feed roll mechanism and the attachment, and a speed sensing means responsive to conditions at the blower) which effect automatic clutch disengagement if overloads occur during operation in the AUTOMATIC mode.

12 Claims, 8 Drawing Figures

FORAGE HARVESTER DRIVE AND ELECTRIC CONTROL THEREFOR

BACKGROUND OF THE INVENTION

1. Field of Use

This invention relates generally to forage harvester machines used in agriculture to cut or chop severed crop material into small pieces and, in particular, to electrical control systems for the drive mechanisms employed in such machines.

2. Description of the Prior Art

One type of prior art tractor-propelled and powered forage harvester machine comprises a feed roll mechanism comprising one or more pairs of rollers for receiving severed crop material and for delivering the material to a rotary cutterhead mechanism which cuts or chops it into small pieces for delivery to a blower which discharges the pieces into a forage wagon behind the harvester. A drive means on the harvester is connectable to the tractor PTO for rotatably driving a rotatable blade element in the cutterhead mechanism. A drive mechanism is provided on the harvester for delivering motive power from the cutterhead mechanism (or from the drive means therefor) to operate the feed roll mechanism. The rotatable elements in the cutterhead mechanism and in the blower are rotatably driven in one direction only, whereas the drive mechanism includes components operable to enable the feed rolls in the feed roll mechanism to be driven forward for normal delivery, to be stopped in case of crop jamming or entry of foreign material therein, or to be driven in reverse to relieve the jamming or dislodge the foreign material. In some prior art drive mechanisms such components include electrically operable clutches which are controlled by selector switches. U.S. Pat. No. 4,049,207 discloses a forage harvester drive mechanism which includes a pair of alternatively engageable electric clutches which are energizable and de-energizable in response to actuation of manually operable electric switches for effecting forward or reverse operation or stoppage of the feed rolls. Prior art forage harvesters, whether employing manually or electrically operable directional control clutches, typically use breakable and replaceable shear pins at one or more locations in the drive mechanism to sever the drive connection to the feed rolls in the event that serious feed roll jamming occurs to thereby prevent mechanical damage to the machine. Prior art forage harvesters of the aforesaid character are relatively complex as regards the construction and mode of operation of the drive mechanism, including the clutches therein, and are relatively costly to manufacture and difficult to maintain and repair. Furthermore, replacement of broken shear pins very often requires partial disassembly of components and is time-consuming and impedes agricultural operations.

The following six (6) U.S. patents illustrate the state of the art: U.S. Pat.Nos. 3,739,559; 3,732,740; 3,523,411; 3,444,673; 3,999,674; and 4,174,072.

SUMMARY OF THE INVENTION

A forage harvester machine in accordance with the invention and adapted to be drawn by and powered from a tractor includes a feed roll mechanism for receiving and feeding crop material to a cutterhead mechanism which then supplies cut-up crop material to a blower for transfer to a forage wagon. A main drive shaft on the harvester is driven by the tractor PTO and drives the cutterhead mechanism and the blower. A drive mechanism supplies motive power from the main drive shaft to drive the feed roll mechanism and any harvester attachments in forward or reverse and includes a single normally disengaged electrically engageable electric clutch and a forward/reverse transmission normally spring-biased in forward and shiftable into reverse as by a solenoid when the solenoid is energized or by mechanical means. Torque sensor devices are provided to mechanically disconnect the feed roll mechanism and any harvester attachment from being driven by the transmission when an overload occurs. An electrical control system for operating the electric clutch and the solenoid for the transmission includes manually operable selector switches located on the tranctor to provide OFF-MANUAL-AUTOMATIC modes for clutch operation and to provide FORWARD/REVERSE modes for transmission operation when in the AUTOMATIC mode. The electric control system further includes overload responsive switches on the harvester (responsive to operation of the torque sensor devices for the feed roll mechanism and the attachment, and a speed sensing means responsive to condition at the blower) which effect automatic clutch disengagement if overloads occur during operation in the AUTOMATIC mode.

As stated above, the forage harvester includes sensing means, such as torque sensor devices, for detecting when the feed roll mechanism or attachment is overloaded, and the electric control system includes overload responsive switch means actuatable by the torque sensor devices to effect de-energization and disengagement of the electric clutch when an overload occurs. The aforementioned speed sensing means includes a magnetic pick-up device for monitoring the PTO speed of the tractor and forage harvester and its purpose is to stop the feed roll mechanism and any attachment by causing the electric clutch to disengage when the PTO speed of the tractor falls to a point just above the speed at which the harvester blower would plug. It thus complements the function of the overload torque sensor devices which could be operated by a tractor capable of overpowering (or overfeeding) the harvester. The speed monitor, on the other hand, operates when the tractor cannot meet the demands of the feed going into the harvester and slows down too much in order to gain torque.

The forage harvester machine operates as follows when being drawn and powered by a tractor.

If the selector switch is OFF, the electric clutch is disengaged and neither the feed roll mechanism nor the attachment drive shaft is being driven. However, the cutterhead mechanism, the spinner and the blower will be in operation.

If the selector switch is in MANUAL mode, the electric clutch is engaged, the transmission is in the FORWARD mode, and the feed roll mechanism and attachment drive shaft are driven in the forward direction. If an overload condition occurs, either torque sensor will mechanically disconnect the overloaded drive train from the transmission but will not actuate the overloaded responsive switch. The speed sensor device will be totally inoperative. Placement of the forward/reverse switch in reverse will not enable shifting of the transmission from forward to reverse.

If the selector switch is in AUTOMATIC mode and the forward/reverse switch is in forward, the electric clutch is engaged, the transmission is in the FORWARD mode, and the feed roll mechanism and attachment drive shaft are driven in the forward direction. If an overload condition occurs, either torque sensor will actuate the overload responsive switch and cause disengagement of the clutch. Should the overload responsive switch circuit fail to operate the overloaded torque sensor will then mechanically disconnect the appropriate drive train. The speed sensor device will be operative in the AUTOMATIC mode. Placement of the forward/reverse switch in reverse will enable shifting of the transmission from forward to reverse.

A forage harvester machine in accordance with the present invention offers numerous advantages over the prior art. For example, the electrical control system is operable in either a MANUAL or an AUTOMATIC mode, and in the latter mode various types of overload conditions automatically stop operation of the feed roll mechanism and any attachment driven by the forage harvester to prevent damage to components. After such stoppage selective reverse operation of the feed roll mechanism can be carefully carried out to clear the condition causing the overload. The system provides for sensing overloads occurring in the feed roll mechanism, or in any attachment powered by the harvester, or in the chopped material duct between the cutterhead and blower resulting from too low a tractor speed. Torque sensor devices which automatically disengage in case of overload and automatically reset substantially eliminate the need for replaceable shear pins in critical locations in the drive mechanism. Indicator lights and a warning alarm indicate, respectively, the mode of system operation and occurrence of an overload. A delay switch actuatable by the transmission shifter prevents engagement of the electric clutch until a shift from forward to reverse is completed. The control system employs a fail-safe design whereby the electric clutch always disengages if electric power is lost. The transmission is constructed so that it normally operates in the forward direction unless positively shifted to reverse by energization of a solenoid. The control system employs a minimum of compact, economical solid state electronic components. The control system lends itself to easy employment of overload sensing switches in addition to and in other locations than shown. Other objects and advantages of the invention will hereinafter appear.

DESCRIPTION OF A PREFERRED EMBODIMENT

Figure 1:
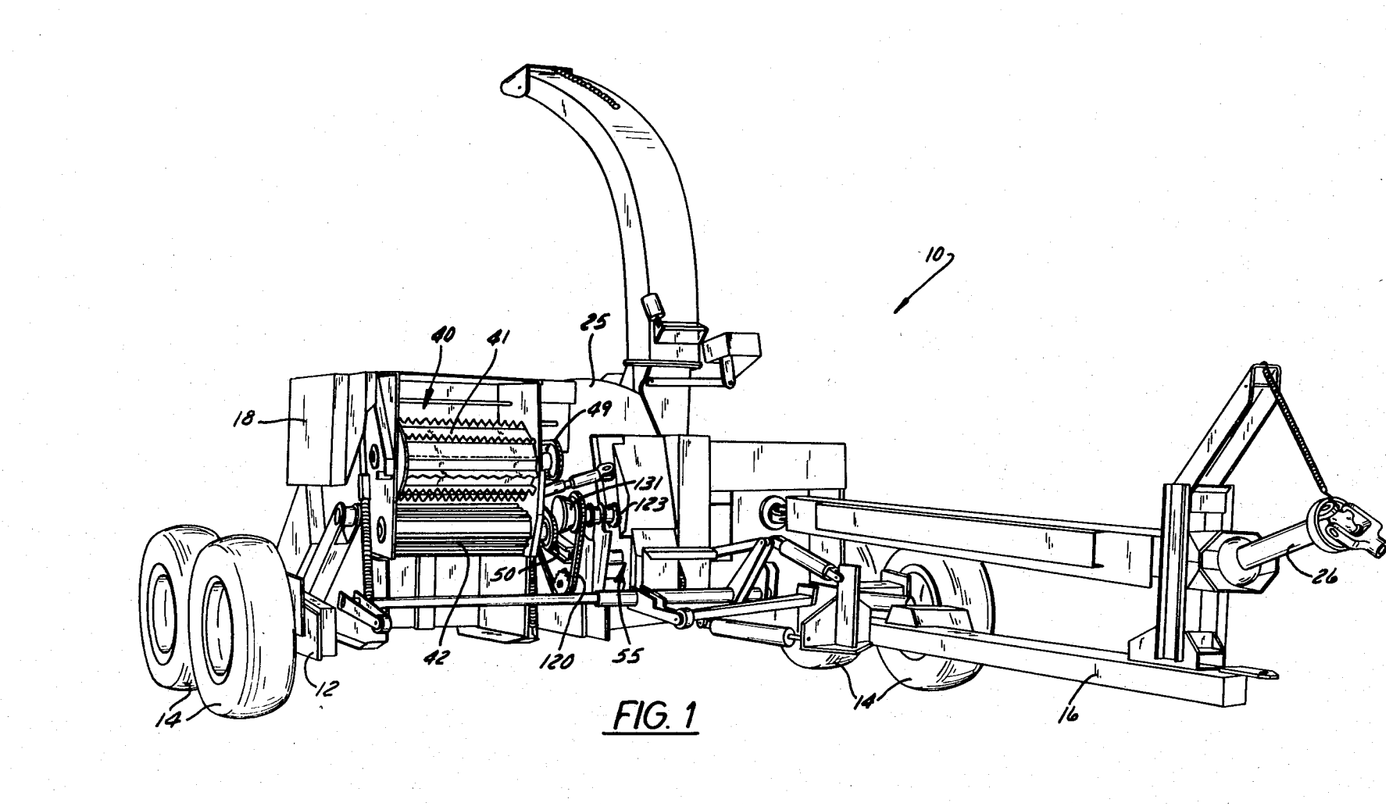
FIG. 1 is a perspective view of a forage harvester machine employing a drive mechanism and electric control system therefor in accordance with the present invention.
Figure 2:
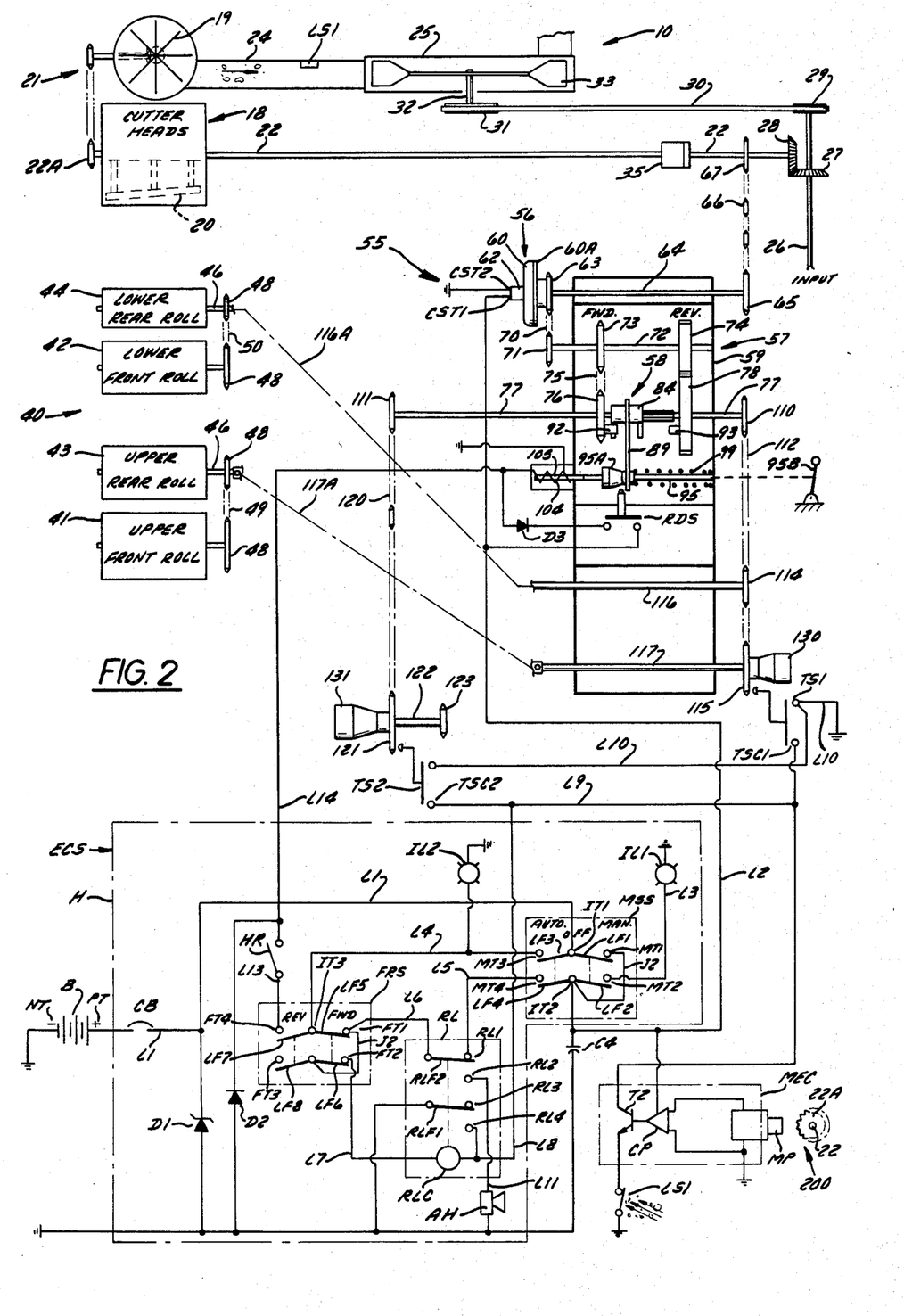
FIG. 2 is a schematic diagram of the machine and control system of FIG. 1.

Referring to FIGS. 1 and 2, the numeral 10 designates a forage harvester machine in accordance with the present invention. Machine 10 comprises a main frame 12 which is supported on opposite sides by pairs of ground-engaging wheels 14. Main frame 12 is provided with a forwardly extending hitching tongue 16 which is adapted for connection to a drawbar (not shown) of a tractor (not shown) whereby the forage harvester machine 10 is drawn rearwardly and to one side of the tractor (not shown).

Machine 10 further comprises a cutterhead mechanism 18 which is mounted on the main frame 12 and includes a rotary bladed cutterhead 20 which is rotatably driven in one direction by a cutterhead shaft 22 and supplies cut crop to a spinner 19 and from thence to an enclosed duct 24 for delivery therethrough to a blower 25 which expels it into a trailing forage wagon (not shown).

The cutterhead shaft 22 (and thus cutterhead 20 and spinner 19) and the blower 25 are driven by a drive means which includes an input shaft 26 which is rotatably mounted on hitching tongue 16 and connectable to be driven by a power take-off shaft or PTO (not shown) on the tractor (not shown). Input shaft 26 has a gear 27 rotatable therewith which drives a gear 28 connected to cutterhead shaft 22. Input shaft 26 also has a pulley 29 rotatable therewith which drives, by means of an endless flexible drive belt 30, a pulley 31 mounted on the shaft 32 for the fan 33 in blower 25. Cutterhead shaft 22 is provided with a normally engaged overrunning clutch 35 allowing the cutterhead 20 to free wheel when tractor power is suddenly disengaged. A chain and sprocket assembly 21 drives spinner 19 from cutterhead shaft 22.

Machine 10 also comprises a feed roll mechanism 40 mounted on one side of main frame 12 and including a front set of opposed upper and lower feed rolls 41 and 42, respectively, and a rear set of opposed upper and lower feed rolls 43 and 44, respectively. Crop material is fed through the front and rear sets of rolls and into the rotary cutterhead 20 wherein the crop material is chopped into short pieces and then delivered by spinner 19 through duct 24 to the blower 25 for expulsion to the trailing forage wagon (not shown). Each feed roll 41, 42, 43 and 44 is provided with a shaft or axle 46 whereby the roll is rotatably mounted on main frame 12 and each axle 46 is provided with a sprocket 48 whereby the roll is rotatably driven. The sprockets 48 for the upper front roll 41 and upper rear roll 43 are connected by an endless flexible drive chain 49 so that when axle 46 of roll 43 is driven, roll 41 is also driven. The sprockets 48 for the lower front roll 42 and lower rear roll 44 are connected by an endless flexible drive chain 50 so that when axle 46 of roll 44 is driven, roll 42 is also driven.

As FIGS. 1, 2, 4, 5 and 6 show, machine 10 further comprises a drive mechanism 55 for supplying motive power from the drive shaft 22 for the driven cutterhead mechansim 18, spinner 19 and blower 25 to the feed roll mechansim 40 and to an attachment drive 123. Drive mechanism 55 generally comprises an electric clutch 56 and a transmission 57, including a shifter mechanism 58, which are mounted on a feed roll drive frame 59 on main frame 12. Drive frame 59 takes the form of a rigid housing on and in which clutch and transmission components are mounted.

Figure 4:
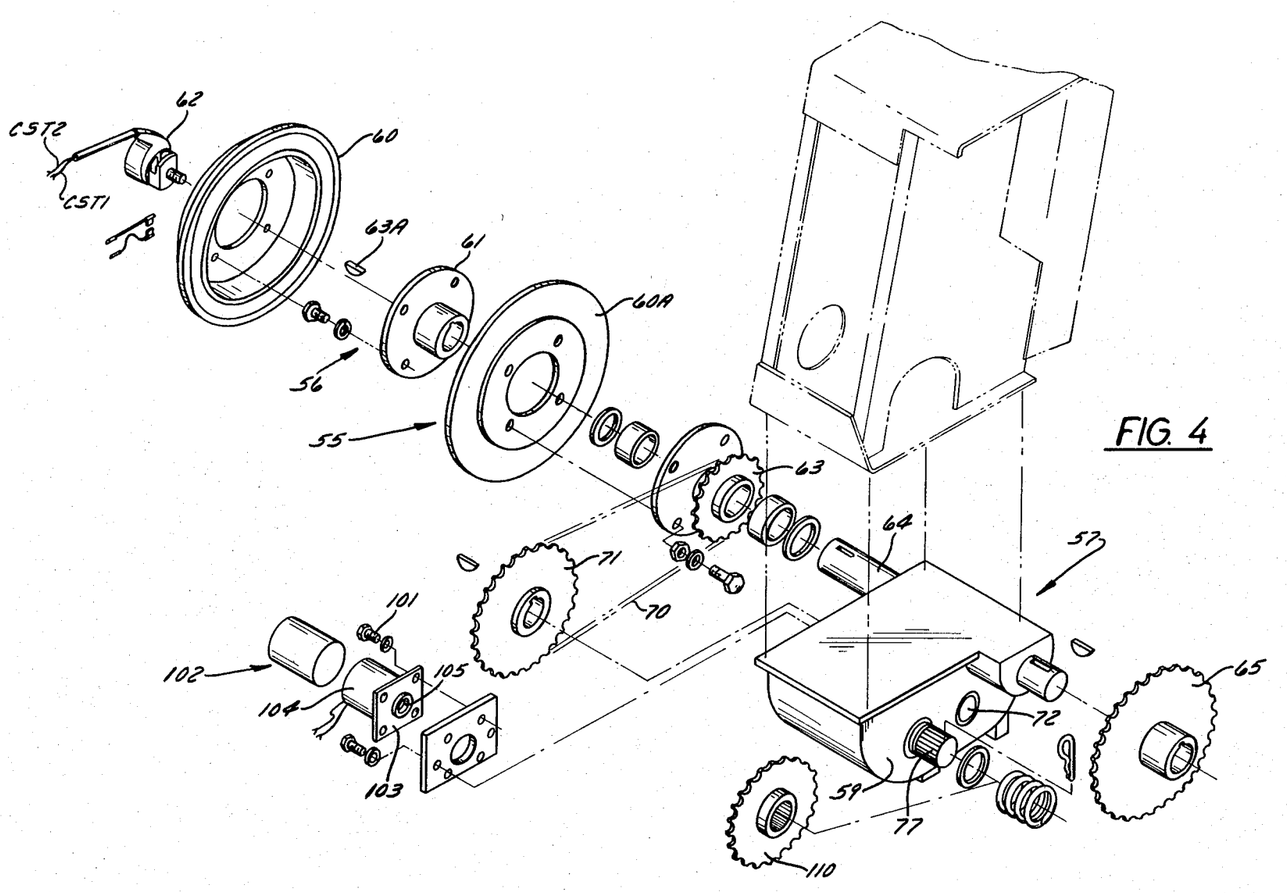
FIG. 4 is an exploded perspective view showing portions of an electric clutch and transmission in the drive mechanism of FIGS. 1 and 2.

As FIGS. 2 and 4 show, electric clutch 56 comprises a two-pole magnetic assembly 60, an armature 60A and a brush holder assembly 62 which, when energized, causes driving engagement between assembly 60 and armature 60A. Assembly 60 and attached hub 61 are rigidly secured to a shaft 64 of transmission 57 as by a key 63A. Electric clutch 56 is mounted on shaft 64 and is operable to effect driving engagement (when energized) or disengagement (when de-energized) of a clutch sprocket 63 by shaft 64 which is rotatably mounted on drive frame 59. The other end of shaft 64 has a sprocket 65 rigidly secured thereto which is connected by an endless flexible chain 66 to a sprocket 67 which is rigidly secured to cutterhead shaft 22. Thus, rotation of shaft 22 effects rotation of shaft 64. When clutch 56 is de-energized and disengaged, rotation of shaft 64 does not effect rotation of clutch sprocket 63, but when clutch 56 is energized and engaged, rotation of shaft 64 effects rotation of clutch sprocket 63. Clutch 56 is a known commercially available component.

Clutch sprocket 63 is connected by an endless flexible chain 70 to a sprocket 71 which is rigidly secured to one end of a shaft 72 which is rotatably mounted on drive frame 59 and forms part of the transmission 57. As FIGS. 2, 5 and 6 show, shaft 72 has a sprocket 73 and a gear 74 rigidly secured thereto for rotation therewith within drive frame housing 59 and these two components are part of forward and reverse drive trains, respectively, of transmission 57.

Forward drive sprocket 73 is connected by an endless flexible chain 75 to a sprocket 76 which is rotatably mounted on a shaft 77 which is rotatably mounted on drive frame housing 59. Reverse drive gear 74 meshes directly with a gear 78 which is rotatably mounted on shaft 77. Thus, when shaft 72, forward drive sprocket 73 and reverse drive gear 74 all rotate simultaneously in a given direction, the sprocket 76 also rotates in the said given direction, whereas the gear 78 rotates in the opposite direction. The shaft 77 comprises a splined portion 80 between the spaced apart cylindrical shaft portions 81 and 82 on which the sprocket 76 and gear 78, respectively, are relatively rotatable.

Figure 5:
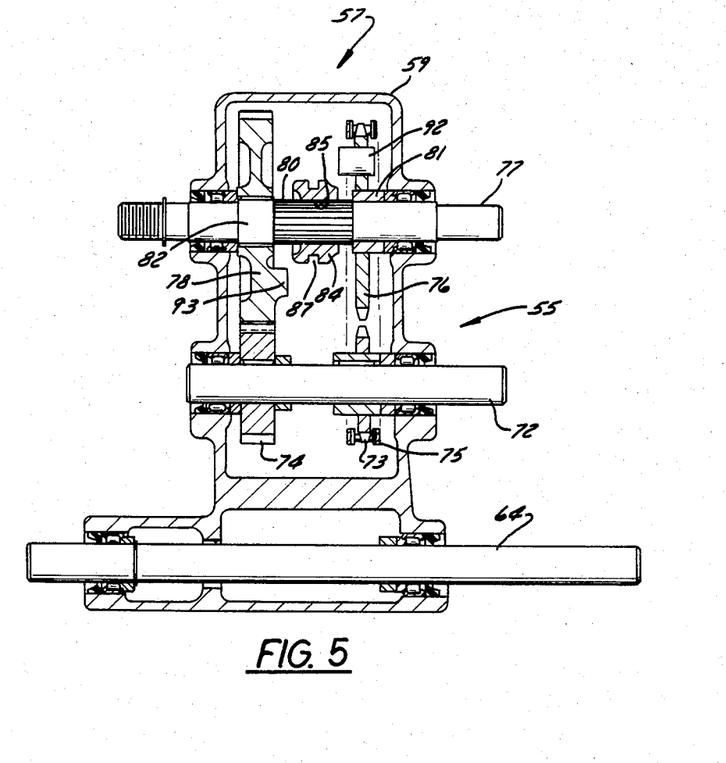
FIG. 5 is an enlarged cross-section view of the shifter employed in the transmission of FIG. 2 and showing it in forward position.
Figure 6:
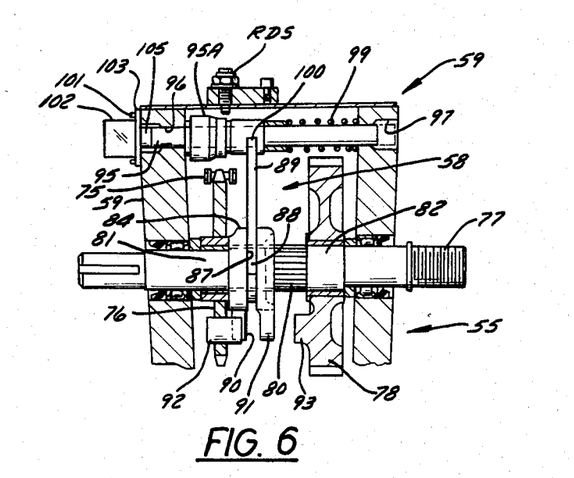
FIG. 6 is a view taken on line 6—6 of FIG. 5.

As FIGS. 5 and 6 show, shifter mechanism 58 includes a shafter member 84 which is mounted on the splined portion 80 of shaft 77 and is axially slidable thereon between two extreme positions, as hereinafter explained. Shifter member 84 is provided with a central axial bore 85 of splined configuration which matches and slidably receives the splined portion 80 of shaft 77. Thus, rotation of shifter member 84 effects corresponding rotation of shaft 77. Shifter member 84 is provided on its exterior with an annular peripheral groove 87 which extends around the axes of member 84 and shaft 77. Groove 87 receives the bifurcated end 88 of a shifter arm or link 89 which is movable as hereinafter explained to effect axial movement of shifter member 84 between its two extreme positions. Shifter member 84 is provided with first and second extension arms 90 and 91, respectively, which are located on opposite sides of groove 87 and extend radially outwardly from the axis of the shifter member. The extension arms 90 and 91 are releasably engageable in interfering relationship with axially extending abutments or projections 92 and 93, respectively, which are rigidly mounted (or integrally formed) on side surfaces of the sprocket 76 and the gear 78, respectively. Shifter link 89 is operable to move shifter member 84 axially to one extreme position wherein the first extension arm 90 engages the projection 92 on sprocket 76, and when this occurs, rotation of sprocket 76 effects corresponding rotation of shifter member 84 and shaft 77 in the aforesaid given (forward) direction. Shifter link 89 is also operable to move shifter member axially to its other extreme position wherein the second extension arm 91 engages the projection 93 on gear 78, and when this occurs, rotation of gear 78 effects corresponding rotation of shifter member 84 and shaft 77 in the aforesaid opposite (reverse) direction.

Shifter mechanism 58 further includes a rod 95 which is mounted for axial movement in two axially spaced apart bores 96 and 97 formed in opposite walls of drive frame housing 59, as FIG. 6 shows. Rod 95 is rigidly secured to the end 100 of link 89 and is normally biased to a forward (leftward relative to FIG. 6) position by means of a helical compression spring 99 which is disposed around rod 95 between the link end 100 and one wall of drive frame housing 59. Rod 95 has affixed thereto a cone-shaped member 95A which serves as an actuator for a reverse delay switch RDS, hereinafter described, which is mounted on housing 59. Rod 95 is selectively axially movable to a reverse (rightward relative to FIG. 6) position against the spring bias by means of a solenoid 102 when the coil 104 of the latter is energized. As FIG. 4 shows, solenoid 102 comprises a mounting flange 103 by which it is secured by screws 101 to the exterior of drive frame housing 59, an energizable wire solenoid coil 104, and an axially movable metal armature 105 which, when coil 104 is energized, moves axially outward of the coil to effect reverse (rightward relative to FIG. 6) movement of rod 95 against the bias of spring 99. Rod 95 could also be shifted manually as by means of a shift lever 95B shown in FIG. 2.

As FIG. 2 shows, the drive mechanism 55 also comprises sprockets 110 and 111 which are rigidly connected to the opposite ends of shaft 77 and rotatable therewith. The sprocket 110 is connected by an endless flexible chain 112 to drive two sprockets 114 and 115 which are connected to the drive shafts 116, and 117, respectively, which are rotatably mounted on drive frame housing 59. The drive shafts 116 and 117 are connected as indicated by lines 116A and 117A respectively, to the axles 46 of the feed rolls 44 and 43, respectively, to effect rotation thereof in either the forward or reverse directions. The sprocket 111 is connected by an endless flexible chain 120 to drive a sprocket 121 on an attachment drive shaft 122 which is rotatably mounted on main frame 12 of machine 10 and has a sprocket 123 usable to drive attachments (not shown) which are connectable to machine 10.

The sprockets 115 and 121 are connected to torque sensor devices 130 and 131, respectively, which are adapted to sense when the components or mechanisms driven by the sprockets 115 and 121 are subjected to overloads which cause high torque and then operate to mechanically disconnect the shafts 117 and 122, respectively, from being driven by transmission 57 and also operate to actuate electric sensor switches TS1 and TS2, respectively, which are part of an electrical control system, hereinafter described, for the electric clutch 56 and for the shifter mechanism 58 of transmission 57. Since the torque sensor devices 130 and 131 are identical to each other, and since the sensor switches TS1 and TS2 are identical to each other, only device 131 and switch TS2 are hereinafter described in detail.

Figures 7, 8:
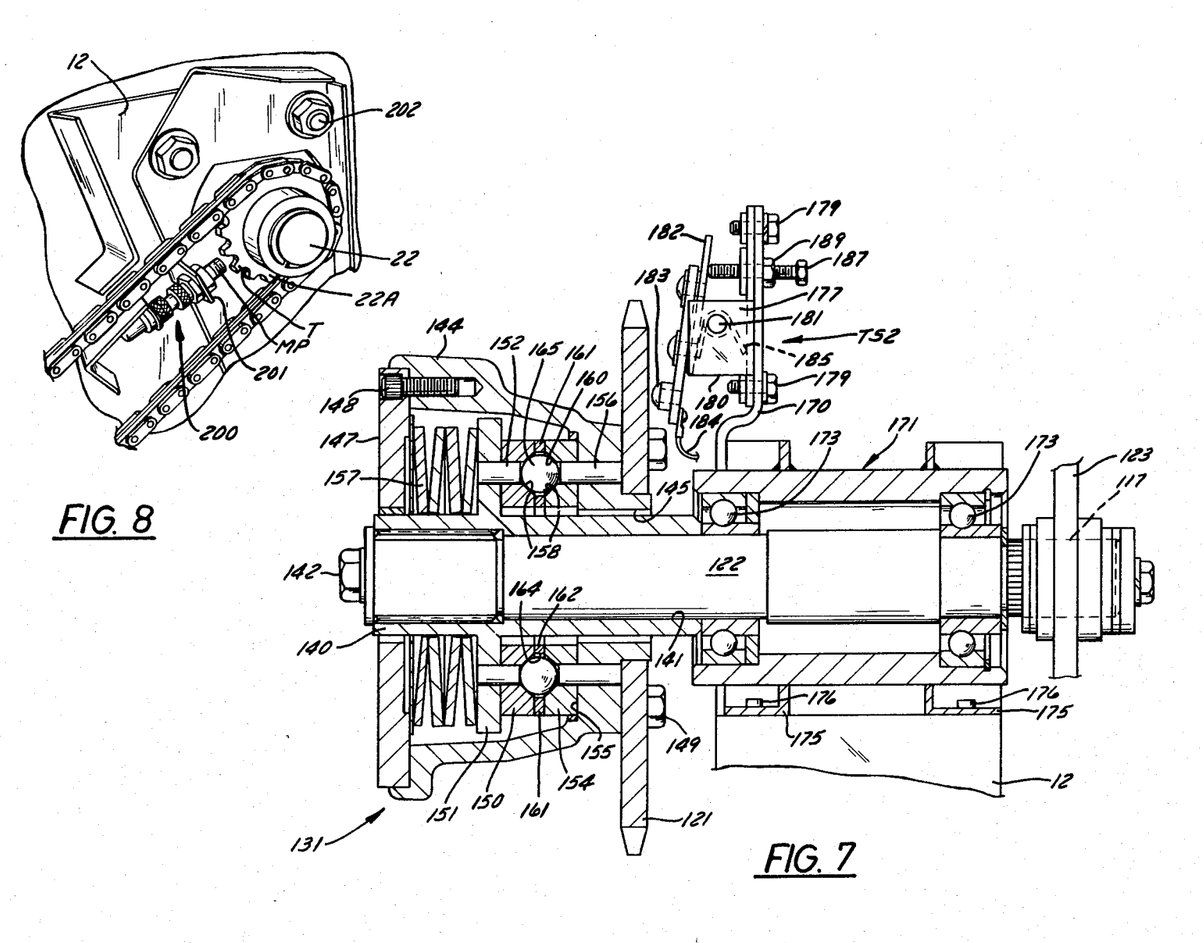
FIG. 7 is an enlarged cross-section view of a torque sensor and a switch actuated thereby shown in FIGS. 1 and 2.
FIG. 8 is an enlarged perspective view of the magnetic speed sensor shown in FIG. 2.

As FIG. 7 shows, torque sensor device 131 comprises a drive hub 140 having a central bore 141 in which shaft 122 is received and a bolt/washer assembly 142 which secures hub 140 on the shaft for rotatation therewith. A cup-shaped torque hub 144 having a central hole 145 which accommodates drive hub 140 is mounted on drive hub 140 and is relatively rotatable with respect thereto. Torque hub 144 has a cap or cover plate 147 connected to one end by screws 148 and the sprocket 121 is rigidly connected to the other end of torque hub 144 by screws 149. A first torque plate 150 is secured to an outwardly extending flange 151 on drive hub 140 by dowel pins 152. A second torque plate 154 is secured to the end wall 155 on the inside of torque hub 144 by dowel pins 156. The torque plates 150 and 154, which are annular in shape and confront each other in spaced apart relationship, are each provided with a plurality of ball-engaging recesses 158 and opposing recesses are normally in registry. A ball cage 161 is disposed in the space between the plates 150 and 154 and takes the form of an annular disc 161 having a central opening 162 for accommodating drive hub 140 and having a plurality of ball-receiving recesses 164 in which steel balls 165 are held. Washer type springs 157 are arranged between flange 151 on drive hub 140 and cap 147 on torque hub 144 and normally act to bias the torque plates 150 and 154 toward each other. Normally, the recesses 158, the recesses 164 and the balls 165 are in registry and the balls effect driving engagement between drive hub 140 and torque hub 144. However, if the torque required to effect rotation exceeds the force imposed by the washer springs 157, which happens when a high torque condition indicative of an overload occurs, then the balls 165 become unseated from the recesses 158 in either or both torque plates 150 and 154 and torque hub 144 and sprocket 121 attached thereto shifts axially (leftward in FIG. 7) relative to drive hub 140 and driving engagement between the hubs ceases to exist for as long as the high torque condition exists.

As FIG. 7 shows, the sensor switch TS2, which is actuated by axial shifting movement of sprocket 121, comprises a base plate 170 which is maintained in proper position relative to sprocket 121 by means of a tube 171 which is connected to plate 170 and mounted on shaft 122 by means of two ball bearing assemblies 173. Tube 171 is prevented from rotating on shaft 122 by means of two brackets 175 which are rigidly secured to tube 171 and to the main frame 12 as by screws 176. Switch TS2 further comprises a pivot pin support bracket 177 which is rigidly secured to base plate 170 by a pair of screws 179 and has two spaced apart projections or sides 180 on which a pivot pin 181 is supported. A movable contact support member 182 is pivotably mounted on pivot pin 181 and carries an electrical contact 183 to which a wire 184 is connected. Contact 183 is electrically insulated from all other components in switch TS2. Contact support member 182 is biased in one direction (clockwise in FIG. 7) by a biasing spring 185 which bears against support bracket 177 and member 182. The travel or position of member 182 is limited by an adjustably positionable stop member or screw 187 which is mounted on base plate 170 and lockable in position by a nut 189.

In operation, when an overload occurs and sprocket 121 shifts rightward (with respect to FIG. 7) in response thereto, it moves into mechanical and electrical contact with switch contact 183 of switch TS2 thereby causing the circuit connected to wire 184 to be grounded. The sprocket shifts only slightly to contact TS2 and is still in driving engagement with shaft 22. Only if the contact does not disengage the clutch does it move further to the right and come out of driving engagement. As hereinafter explained, this results in de-energization and disengagement of electric clutch 60.

Figure 3:
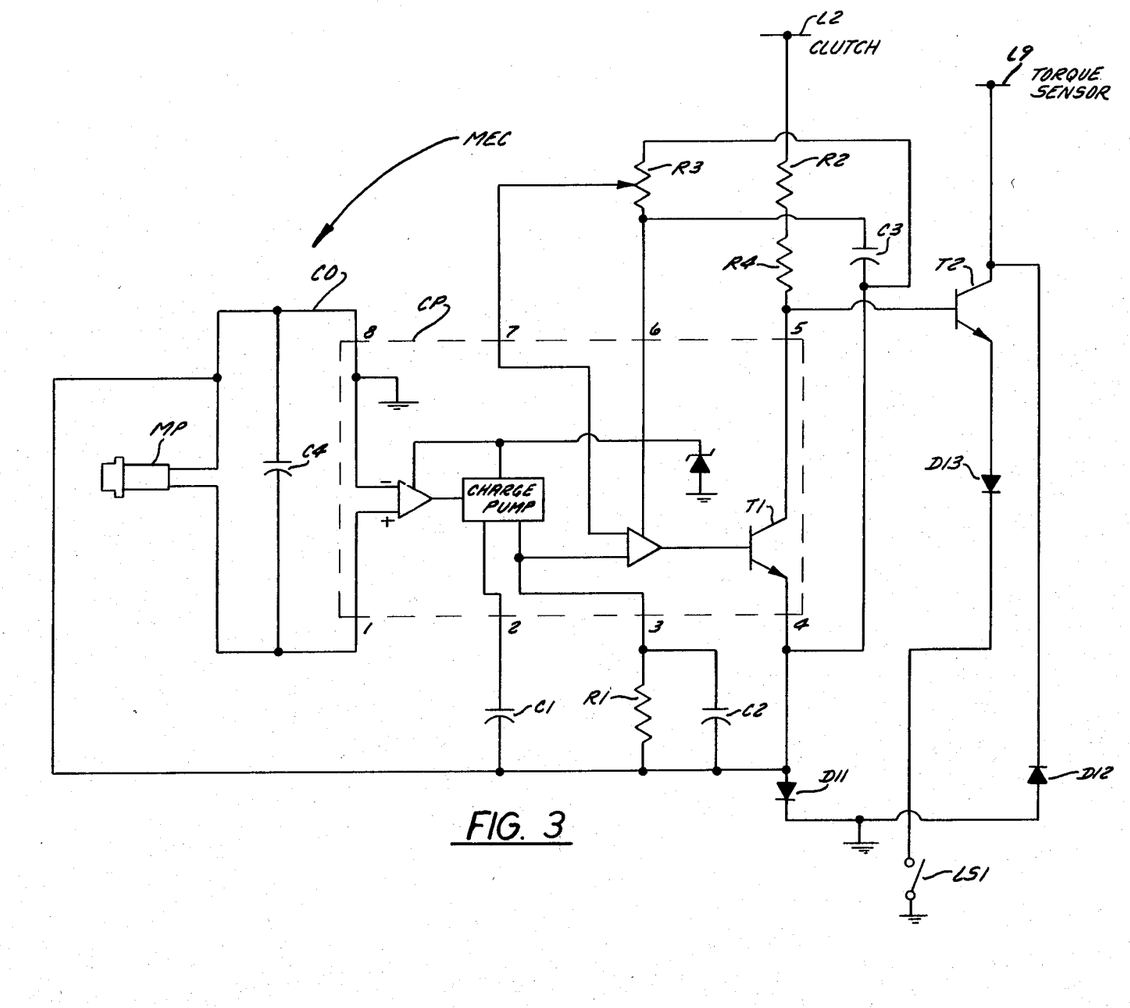
FIG. 3 is an enlarged circuit diagram of a portion of the control system of the schematic diagram of FIG. 2.

As FIGS. 2, 3 and 8 show, harvester 10 is provided with a speed monitoring device 200 which includes a mounting bracket 201 attached by bolts 202 to frame 12 of the harvester in the vicinity of shaft 22. Bracket 201 supports a magnetic pickup device MP which is disposed adjacent a sprocket 22A on shaft 22. Device MP is part of an electric circuit MEC shown in FIGS. 2 and 3 and hereinafter described. Magnetic pick-up device MP is a commercially available device that generates an electric pulse each time a sprocket tooth T moves therepast. The frequency of the pulses is, therefore, proportional to the rotational speed of shaft 22. The purpose of speed sensing device 200 is to stop the harvester feed roll mechanism 40 and attachment drive shaft 122 by causing the electric clutch 60 to disengage when the speed of the tractor (not shown) falls to a point just above the speed at which the harvester blower 25 would plug. It thus complements the function of the torque sensors 130 and 131 which could be operated by a tractor capable of overpowering or overfeeding the harvester 10. The speed monitor device 200, on the other hand, operates when the tractor (not shown) cannot meet the demands of the feed going into the harvester and slows down too much in order to gain torque. As hereinafter explained in detail, magnetic pick-up MP is electrically connected to a limit switch LS1 which, as FIG. 2 shows, is located in duct 24. Switch LS1 is placed in the path of feed going through the duct 24 between harvester spinner 19 and blower 25. Normally open switch LS1 is closed by feed therein. The circuit MEC is allowed to cause disengagement of clutch 60 in response to sensing of low tractor speed by magnetic pick-up MP only when feed is going through the harvester 10 and it will not operate to disengage clutch 60 when the tractor speed is intentionally reduced as it often is at the end of a corn row or windrow.

As FIG. 2 shows, the electrical control system ECS is energized by a battery B, such as a 12 volt D.C. automotive battery, (or alternator or generator, not shown) mounted on the tractor (not shown) and comprises manually operable selector switches designated MSS, FRS and HR and a relay RL mounted in a housing H located on the tractor, as well as torque sensing switches TS1 and TS2, a delay switch RDS and a speed sensing magnetic pickup device MP located on certain components of the forage harvester.

Negative battery terminal NT is grounded to the tractor frame (not shown) and to the frame 12 of forage harvester 10. Positive battery terminal PT is connected through a power supply line L1 (which includes a normally closed circuit breaker or fuse CB) to an input terminal IT1 of manual selector switch MSS. A Zener diode D1 (such as Motorola MR2525) connected between line L1 and ground prevents an accidental reversed battery connection from damaging system components and also protects the system against a drop-out pulse from relay RL.

Switch MSS is a manually operable double pole double throw three-position toggle switch having OFF, MANUAL and AUTOMATIC positions and is shown in OFF position in FIG. 2. When switch MSS is in MANUAL position, its battery energized input terminal IT1 is connected through closed leaf LF1 to manual output terminal MT1, through jumper J1 and through power supply line L2 to a clutch solenoid terminal CST1 on electric clutch 60 to energize and engage the latter. The other clutch solenoid terminal CST2 is grounded. A capacitor C4 (such as a 47 μf/63WVDC) is connected between line L2 and ground to prevent arcing across the switch and relay contacts consistent with the minimum drop-out time of clutch 60. When switch MSS is in MANUAL position, its input terminal IT2 is energized through jumper J1 and is connected through closed leaf LF2, through manual output terminal MT2 and through a power supply line L3 to one side of an indicator light IL1 (the other side of which is grounded) which illuminates to indicate that the clutch system is in the MANUAL mode.

When switch MSS is in MANUAL position, clutch 60 is energized and engaged thereby causing drive power to be transmitted from rotating shaft 64, through sprocket 63, drive chain 70, sprocket 71, shaft 72, forward sprocket 73, chain 75, forward sprocket 76, to drive shaft 77. Shaft 77 rotates in the FORWARD direction and drives its affixed sprockets 110 and 111 in the same direction thereby causing feed roll drive sprocket 115 (and the rolls of feed roll mechanism 40) and attachment drive sprocket 123 to be drive in the FORWARD direction. With feed roll mechanism 40 operating FORWARD and blower 19 in operation, duct 24 fills with chopped forage material and this effects closure of a normally open limit switch LS1. However, when switch MSS is in MANUAL position, the selector switch FRS, reverse switch HR, the relay RL, the overload switches TS1 and TS2, and the limit switch LS1 are inoperative.

When switch MSS is placed in AUTOMATIC position, instead of OFF or MANUAL, its battery energized input terminal IT1 is connected through closed leaf LF3 to automatic output terminal MT3 and its input terminal IT2 is connected through closed leaf LF4 to automatic output terminal MT4. Closure of leaf LF3 energizes power supply line L4 which is connected to energize input terminal IT3 of forward/reverse selector switch FRS. Forward/reverse selector switch FRS is a manually operable double pole double throw three-position toggle switch having FORWARD, OFF and REVERSE positions and is shown in FORWARD position in FIG. 2. Line L4 is connected to one side of an indicator light IL2, (the other side of which is grounded) which illuminates to indicate that the system is in the AUTOMATIC mode. Closure of leaf LF4 connects line L2 (from electric clutch 60) to automatic output terminal MT4 and from thence through a power supply line L5 to a stationary relay contact RL1 of relay RL.

Relay RL is a double pole double throw relay having a relay coil RLC which, when de-energized as shown in FIG. 2, maintains its two movable leaf contacts RLF1 and RLF2 connected to its stationary relay contacts RL1 and RL3, respectively. When coil RLC is energized, it connects its movable contacts RLF1 and RLF2 to its stationary relay contacts RL2 and RL4, respectively.

When forward/reverse selector switch FRS is in the FORWARD position shown in FIG. 2 and relay RL is in the de-energized condition shown in FIG. 2, a circuit is established between lines L4 and L5 to effect energization and engagement of electric clutch 60 through closed leaf LF5 of switch FRS, through closed leaf RLF2 of relay RL and through a supply line L6 between stationary contact FT1 and leaf RLF2. However, if either or both of the normally open torque sensor switches TS1 or TS2 were to close in response to an overload detected by torque sensor 130 or 131, respectively, then a circuit is established which causes energization of relay coil RLC with resultant de-energization and disengagement of electric clutch 60 thereby causing roller feed mechanism 40 and any driven attachment to stop. In particular, as FIG. 2 shows, one side of relay coil RLC is connected for energization from positive battery terminal PT through a line L7 to stationary terminal FT2 of forward/reverse switch FRS, and the latter terminal is connected by leaf LF6 and by a jumper J2 to stationary terminal FT1 of switch FRS. The other side of relay coil RLC is connected by a line L8 to a line L9 which is connected between stationary contacts TSC1 and TSC2 of the normally open torque sensor switches TS1 and TS2, respectively. When either or both of the latter switches closes in response to an overload, L9 becomes connected to a line L10 which is grounded and this completes a circuit when energizes relay coil RLC. When relay coil RLC is thus energized, it operates to move its leaf RLF2 out of engagement with stationary contact RL1, thereby interrupting the circuit which energizes electric clutch 60, and into engagement with a stationary contact RL2 which is connected by a line L11 to one side of an alarm horn AH, the other side of which is grounded, thereby causing the alarm to be energized and to sound and indicate the overload and clutch disengagement to the operator. Energization of relay coil RLC also causes grounded leaf RLF1 to move into engagement with grounded relay contact RL4, thereby establishing a holding circuit to keep relay coil RLC energized even after the sensor switches TS1 and TS2 are both reopened and until selector switch MSS is moved to OFF or forward-/reverse switch FRS is moved to OFF.

In the course of normal or usual operation of forage harvester 10, when an overload occurs as a result of crop material being jammed in between the rolls of the feed roll mechanism 40 and causes de-energization and disengagement of clutch 60 thereby stopping the feed roll mechanism 40 and any attachment, the operator can usually remove the overload by operating the feed roll mechanism 40 in reverse for a short period of time. This is accomplished by retaining switch MSS in AUTOMATIC and by moving forward/reverse switch FRS from the FORWARD position shown in FIG. 2 to the REVERSE position. As previously stated, this has the immediate effect of de-energizing relay coil RLC and alarm horn AH, but when leaf LF5 of forward/reverse switch FRS opens the clutch 60 can no longer be energized through the path hereinbefore described and will be energized to enable reverse operation of the feed roll mechanism 40 and any attachment as hereinafter described. When leaf LF7 of switch FRS is closed, stationary contact FT4 of switch FRS becomes energized. Contact FT4 is connected by a line L13 to one side of a single pole single throw spring-biased normally open manually operable switch HR which has its other side connected by a line L14 to one side of solenoid coil 104 of solenoid 102 of transmission 57. A diode D2 (such as a type 1N4003) is connected between line L14 and ground to prevent arcing across switch HR when solenoid 102 drops out. The other side of solenoid coil 104 is connected to ground. When switch HR is manually moved to closed position, solenoid coil 104 becomes energized and, as hereinbefore described, causes shifter mechanism 58 to shift from the forward condition shown in FIG. 2 to reverse condition wherein the feed roll mechanism 40 and any attachments operate in reverse. As FIGS. 2 and 6 show, shiftable rod 95 has affixed thereto a cone-shaped actuator 95A which engages and closes a single pole single throw normally spring-biased open reverse delay switch RDS during shifting movement of member 95A from forward to reverse position against the bias of spring 99. Switch RDS is connected on one side through a diode D3 (such as type 1N5400) to line L14 and is connected on its other side through line L2 to terminal CST1 of electric clutch 60. Diode D3 prevents solenoid coil 104 from remaining energized when solenoid 102 is being switched rapidly from reverse to forward. When switch RDS is closed, clutch 60 becomes energized and engaged and by this time the components of shifter mechanism 58 have been moved fully into reverse position. When switch HR is allowed to open, solenoid coil 104 becomes de-energized, shifter 58 returns from reverse to forward condition, switch RDS reopens and clutch 60 becomes de-energized and disengaged.

As FIGS. 2 and 3 show, the electric control circuit includes the magnetic pick-up MP for a speed monitoring device 200 and an electric circuit MEC showing its relationship to the torque sensing devices 130 and 131. The purpose of speed sensing device 200 is to stop the harvester feed roll mechanism 40 and any attachment by causing the electric clutch 60 to disengage when the speed of the tractor (not shown) falls to a point just above the speed at which the harvester blower 25 would plug. It thus complements the function of the torque sensors 130 and 131 which would be operated by a tractor capable of overpowering or overfeeding the harvester 10. The speed monitor device 200, on the other hand, operates when the tractor (not shown) cannot meet the demands of the feed going into the harvester and slows down too much in order to gain torque.

Circuit MEC functions by taking a voltage proportional to the speed of the feed rollers from the magnetic pick-up MP and comparing it to a fixed voltage selected by R3.

When the magnetic pick-up voltage falls below the fixed voltage, a bias signal is removed from transistor T1 in a chip circuit CP preventing current from flowing thru the chip transistor T1. This, in turn, biases an external transistor T2 in parallel with the relay-torque sensor control circuit ECS allowing the relay coil RLC to be grounded, thus shutting off current to the electric clutch 60 and disengaging it. The grounding, however, is done thru a switch LS1 placed in the path of feed going thru the tunnel between the harvester spinner and blower and which is closed by feed therein. If the circuit is allowed to ground only when feed is going through the harvester 10 it will then not operate to disengage clutch 60 when the tractor speed is intentionally reduced as it often is at the end of a corn row or windrow. The fixed voltage, mentioned above, to which the magnetic pick-up voltage is compared, is a voltage selected to be the same as the magnetic pick-up voltage at a speed just slightly above the desired cut-off, or critical blowing speed. It has been found that this speed to be about 70% or normal operating speed regardless of the type or model of tractor.

As FIG. 3 shows, circuit MEC includes chip CP which, for example, takes the form of a type LM2917N-8 integrated circuit having eight terminals designated 1 through 8 to which external electronic components such as resistors R1, R2, R3, R4, capacitors C1, C2, C3, C4, and diodes D11, D12, D13, are connected in accordance with the published specifications for integrated circuit CP, in addition to the hereinbefore mentioned components.

OPERATION

Forage harvester machine 10 operates as follows when being drawn and powered by a tractor.

Assume that switch MSS is OFF and that switch FRS is in either forward or reverse. Under these circumstances, clutch 60 is disengaged and neither the feed roll mechanism 40 nor attachment drive shaft 122 is being driven. However, cutterhead mechanism 18, spinner 19 and blower 25 will be in operation.

Now assume that switch MSS is in MANUAL mode and that switch FRS is in either forward or off. Under these circumstances clutch 60 is engaged, transmission 57 is in the FORWARD mode, and feed roll mechanism 40 and attachment drive shaft 122 are driven in the forward direction. If an overload condition occurs, either torque sensor 130 or 131 will mechanically disconnect the appropriate drive train from the transmission 57, but actuation of either switch TS1 or TS2 will not cause disengagement of clutch 60, nor will speed sensor device 200 be operative in the MANUAL mode. Placement of switch FRS in reverse and closure of switch HR will not effect shifting of transmission 57 from forward to reverse.

Now assume that switch MSS is in AUTOMATIC mode and that switch FRS is in forward. Under these circumstances clutch 60 is engaged, transmission 57 is in the FORWARD mode, and feed roll mechanism 40 and attachment drive shaft 122 are driven in the forward direction. If an overload condition occurs, either torque sensor 130 or 131 will mechanically disconnect the appropriate drive train from the transmission 57, and actuation of either switch TS1 or TS2 will cause disengagement of clutch 60. Speed sensor device 200 will be operative in the AUTOMATIC mode. Placement of switch FRS in reverse and closure of switch HR will effect shifting of transmission 57 from forward to reverse.

In the embodiment disclosed hereinbefore, the transmission 57 is operated by a solenoid 102, but it is to be understood that the transmission could be shifted by some other means, such as a manually operable manual lever 95B shown in FIG. 2.

It will also be apparent that, in some applications, the transmission could be omitted entirely, as in a low-cost machine where only forward operations of components is possible.

It is to be further understood that in the embodiment disclosed, the function of the speed monitoring device 200 is to shut down the feed roll mechanism 40 and the attachment drive 123 by disengaging the electric clutch 56 whenever a drop in tractor speed occurs which is sufficient to create a malfunction in the most speed-sensitive components as in the hydraulic implement combinations. In the embodiment disclosed, this speed-sensitive component is the blower 25 but it could just as well be a component (not shown) such as a corn head cutting mechanism, a back-up unit on a hay head, or a cutting cylinder on the harvester, if those components were designed to operate at lower speeds closer to their critical speeds than is the blower 25. The aforementioned malfunctions typically comprises in the case of a corn head cutting device, failure to cut the corn head off. In the case of a cutting cylinder on the harvester, it could be a condition in which incoming matter cannot get through the cylinder knives. In the case of a back-up device on a hay head, it could be a condition where the incoming hay cannot be lifted off the ground fast enough to accommodate the ground speed of the harvester.

We claim:

1. A forage harvester adapted to be propelled and powered by a tractor comprising:
   a blower;
   a cutterhead mechanism for supplying cut crop material to said blower;
   a feed roll mechanism for feeding crop material to said cutterhead mechanism;
   an attachment drive shaft;
   drive means for driving said blower and said cutterhead mechanism;
   a drive mechanism for supplying motive power from said drive means to said feed roll mechanism and said attachment drive shaft, said drive mechanism comprising an electric clutch and a shiftable forward/reverse transmission;
   a first torque responsive mechanical clutch connected between said transmission and said feed roll mechanism;
   a second torque responsive mechanical clutch connected between said transmission and said attachment drive shaft;
   each of said torque responsive mechanical clutches being adapted to disengage when overloaded;
   means selectively operable to effect shifting of said transmission between forward and reverse;
   and an electrical control system comprising switch means selectively operable to effect engagement and disengagement of said electric clutch;
   and fault switch means responsive to disengagement of either of said first and second torque responsive clutches to effect disengagement of said electric clutch.

2. A forage harvester according to claim 1 wherein said electric clutch is disengaged when de-energized and engaged when electrically energized and wherein said transmission is spring-biased into forward position and is shiftable to reverse.

3. A forage harvester according to claim 1 wherein said control means comprises sensing means for sensing the possibility of a material overload between said cutterhead mechanism and said blower and wherein said fault switch means is responsive to said sensing means to effect disengagement of said electric clutch when such possibility of a material overload arises.

4. A forage harvester according to claim 3 wherein said sensing means comprises second fault switch means responsive to the presence of crop material between said cutterhead mechanism and said blower to provide an electric signal related thereto, speed sensing means to sense the speed of rotation of said blower on said harvester driven by said tractor and for providing an electric signal related thereto, and means to combine both of said signals and to provide an output signal for operating said fault switch means.

5. A forage harvester adapted to be propelled and powered by a tractor comprising:
   a blower;
   a cutterhead mechanism for supplying cut crop material to said blower;
   a feed roll mechanism for feeding crop material to said cutterhead mechanism;
   an attachment drive shaft;
   drive means for driving said blower and said cutterhead mechanism;
   a drive mechanism for supplying motive power from said drive means to said feed roll mechanism and said attachment drive shaft, said drive mechanism comprising an electric clutch and a solenoid-operated shiftable forward/reverse transmission;
   a first torque responsive mechanical clutch connected between said transmission and said feed roll mechanism;
   a second torque responsive mechanical clutch connected between said transmission and said attachment drive shaft;
   each of said torque responsive mechanical clutches being adapted to disengage when overloaded;
   and an electrical control system comprising first switch means selectively operable to effect engagement and disengagement of said electric clutch;
   second switch means selectively operable to effect shifting of said transmission between forward and reverse;
   and third switch means responsive to disengagement of either of said first and second torque responsive clutches to effect disengagement of said electric clutch.

6. A forage harvester according to claim 5 wherein said electric clutch is disengaged when de-energized and engaged when electrically energized and wherein said transmission is spring-biased into forward position and shifts to reverse when electrically energized.

7. A forage harvester according to claim 5 wherein said control means comprises sensing means for sensing the possibility of a material overload between said cutterhead mechanism and said blower and wherein said third switch means is responsive to said sensing means to effect disengagement of said electric clutch when such possibility of a material overload arises.

8. A forage harvester according to claim 7 wherein said sensing means comprises fourth switch means responsive to the presence of crop material between said cutterhead mechanism to provide an electric signal related thereto, speed sensing means to sense the speed of rotation of said blower on said harvester driven by said tractor and for providing an electric signal related thereto, and means to combine both of said signals and to provide an output signal for operating said third switch means.

9. A forage harvester adapted to be propelled and powered by a tractor comprising:
   a blower;
   a cutterhead mechanism for supplying cut crop material to said blower;
   a feed roll mechanism for feeding crop material to said cutterhead mechanism;
   an attachment drive shaft;
   drive means for driving said blower and said cutterhead mechanism;
   a drive mechanism for supplying motive power from said drive means to said feed roll mechanism and said attachment drive shaft, said drive mechanism comprising an electric clutch;

a first torque responsive mechanical clutch connected between said electric clutch and said feed roll mechanism;

a second torque responsive mechanical clutch connected between said electric clutch and said attachment drive shaft;

each of said torque responsive mechanical clutches being adapted to disengage when overloaded;

and an electrical control system comprising switch means selectively operable to effect engagement and disengagement of said electric clutch;

and fault switch means responsive to disengagement of either of said first and second torque responsive clutches to effect disengagement of said electric clutch.

10. A forage harvester according to claim 9 wherein said electric clutch is disengaged when de-energized and engaged when electrically energized.

11. A forage harvester according to claim 9 wherein said control means comprises sensing means for sensing the possibility of a material overload between said cutterhead mechanism and said blower and wherein said fault switch means is responsive to said sensing means to effect disengagement of said electric clutch when such possibility of a material overload arises.

12. A forage harvester according to claim 11 wherein said sensing means comprises second fault switch means responsive to the presence of crop material between said cutterhead mechanism to provide an electric signal related thereto, speed sensing means to sense the speed of rotation of said blower on said harvester driven by said tractor and for providing an electric signal related thereto, and means to combine both of said signals and to provide an output signal for operating said fault switch means.

* * * * *